United States Patent
Kübel et al.

(10) Patent No.: US 6,491,007 B1
(45) Date of Patent: Dec. 10, 2002

(54) HYDRAULICALLY CONTROLLABLE GLOBE VALVE

(75) Inventors: Michael Kübel, Karlsruhe (DE); Knud Lembke, Karlsruhe (DE); Ulrich Letsche, Stuttgart (DE); Rudolf Thom, Stuttgart (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/443,923

(22) Filed: Nov. 19, 1999

(30) Foreign Application Priority Data

Nov. 19, 1998 (DE) .......................... 198 53 355

(51) Int. Cl.[7] .......................... F01L 9/02; F16K 31/363
(52) U.S. Cl. .................... 123/90.12; 137/906; 251/25
(58) Field of Search .................... 123/90.11, 90.12, 123/90.13, 90.15, 90.65; 91/356, 392, 461; 137/906; 251/25, 31

(56) References Cited

U.S. PATENT DOCUMENTS

| | | | | |
|---|---|---|---|---|
| 5,448,973 A | * | 9/1995 | Meyer | 123/90.12 |
| 5,577,468 A | * | 11/1996 | Weber | 123/90.12 |
| 5,765,515 A | * | 6/1998 | Letsche | 123/90.12 |
| 5,809,950 A | * | 9/1998 | Letsche et al. | 123/90.12 |

FOREIGN PATENT DOCUMENTS

| | | |
|---|---|---|
| DE | 38 36 725 | 12/1989 |
| DE | 195 01 495 | 11/1995 |
| DE | 196 21 719 | 7/1997 |
| DE | 196 21 951 | 7/1997 |
| DE | 197 16 042 | 5/1998 |

* cited by examiner

*Primary Examiner*—Weilun Lo
(74) *Attorney, Agent, or Firm*—Kenyon & Kenyon

(57) ABSTRACT

A hydraulically controllable globe valve having a stem piston to which pressure can be applied by a spring connected to a pressure source, with the stem piston being able to move from a first end position in the direction of a second end position. Pressure control means are provided which maintain a constant pressure of the hydraulic spring means on the stem piston while the latter moves from the first end position in the direction of the second end position by connecting the hydraulic spring means to a pressure source during a variable portion of the valve lift. The valve can be used, for example, as a gas exchange valve in a reciprocating engine.

7 Claims, 4 Drawing Sheets

HYDRAULICALLY CONTROLLABLE GLOBE VALVE

FIELD OF THE INVENTION

The present invention relates to a hydraulically controllable globe valve, in particular a gas exchange valve of an internal combustion engine, having a stem piston to which a pressure can be applied by hydraulic spring means connected to a pressure source, and which can move from one end position in the direction of a second end position.

BACKGROUND INFORMATION

A hydraulic actuator for a globe valve in an internal combustion engine, which is known from German Patent No. 38 36 725, has a piston connected to the valve shaft and guided in a cylindrical working space, with a spring-loaded arrangement provided at both ends of the piston so that the piston is forced, when rest, into a central position in which the globe valve is partially open. To move the globe valve into an open or closed position, hydraulic pressure can be alternately applied to the piston from a pressure source. A feed pump serving as the pressure source and a switchable multiway valve are provided for this purpose.

A hydraulic valve controller for a globe valve in an internal combustion engine, which is known from German Patent No. 195 01 495, has a helical compression spring that loads the globe valve in the closing direction as well as hydraulic spring means that can be connected alternately to a pressure source and a pressure sink by a switchable multi-way valve, with these spring means being able to move the globe valve in the opening direction via a stem piston that can move along with the globe valve.

Hydraulic control mechanisms for a gas exchange globe valve in an internal combustion engine are known from German Patent No. 196 21 951 and German Patent No. 196 21 719, in which first spring means loading the valve in the closing direction and second spring means loading the valve in the opening direction via a stem piston are assigned to the globe valve, with these spring means including a series arrangement of one mechanical and one hydraulic spring. The second spring means form a spring arrangement with a progressive total spring characteristic, with the hydraulic spring being prestressed by a force exceeding the maximum force of the helical spring as a function of the opening work of the globe valve. A correspondingly high supply pressure for the control mechanism is provided for this purpose.

A hydraulic control mechanism for a globe valve in an internal combustion engine, to which there are assigned first spring means for applying pressure in the closing direction and second hydraulically controllable spring means for applying pressure in the opening direction, is known from German Patent No. 197 16 042. The second hydraulically controllable spring means can be cyclically applied with pressure and then relieved again, with an auxiliary control element, which can relieve the pressure on the second hydraulically controllable spring means in the event of a globe valve malfunction, being assigned to these second hydraulically controllable spring means. The auxiliary control element preferably has a 2/2-way valve function and is connected via control lines to a pressure supply line and a pressure relief line which can be switched by a central actuator having an on-off valve. The auxiliary control element is also held in its closed rest position by a mechanical resetting spring.

As mentioned above, the fact that the actuating energy, e.g., the opening energy, of a exhaust valve fluctuates with the combustion chamber pressure, and thus with the engine load, is a problem in gas exchange valves of internal combustion engines. The conventional remedy is to set different opening forces, which can be done using the above-mentioned spring means having a series arrangement of one mechanical and one hydraulic spring. One drawback of this arrangement, however, is that the working space volume of the hydraulic spring increases as the opening movement of the valve stem piston begins, causing the hydraulic pressure built up at the spring to drop rapidly. In addition, the hydraulic pressure setting of the hydraulic spring must be adjusted to the engine operating state to generate an optimum force for opening the valve.

SUMMARY OF THE INVENTION

An object of the present invention is to provide a globe valve of the type mentioned in the preamble which can be moved by a variable actuating energy supplied by the hydraulic spring means without requiring any variable supply pressures for the hydraulic spring means.

This object is achieved according to the present invention by providing pressure control means which maintain a constant pressure of the hydraulic spring means on the stem piston while the latter moves from the first end position in the direction of the second end position by connecting the hydraulic spring means to the pressure source during a variable portion of the valve lift. This makes it possible to vary the energy applied to the stem piston during the valve lift by selecting a longer or shorter value for the portion of the valve lift during which the hydraulic spring means apply the working pressure of the pressure source to the stem piston, at the same time maintaining a constant hydraulic spring means pressure. As a result, the actuating energy of the globe valve can be varied without changing the working pressure of the pressure source.

In one embodiment of the present invention, the hydraulic spring means are connected to the pressure source by the fact that the pressure control means is provided with a first annular space connected to the pressure source and located in a valve housing surrounding the stem piston as well as a further annular space connected to the hydraulic spring means via a pressure channel, with this second annular space being connected to the first annular space via a control groove in the stem piston during the variable portion of the valve lift. This automatically connects the hydraulic spring means to the pressure source when the stem piston moves from the first end position in the direction of the second end position, provided that the first annular space is connected to the pressure source. The hydraulic spring means are also automatically separated from the pressure source as soon as the control groove no longer connects the two annular spaces to each other. As long as the two annular spaces are connected via the control groove, the application of supply pressure from the pressure source to the hydraulic spring means can be controlled by opening and closing the connection between the first annular space and the pressure source.

In a further embodiment of the present invention, the hydraulic spring means are connected to the pressure source by providing the pressure control means with a first annular space connected to the pressure source and located in a valve housing surrounding the stem piston as well as a control groove, located in the stem piston, which can be connected to the hydraulic spring means via a pressure channel provided in the stem piston, with the control groove being connected to the annular space during the variable portion of the valve lift. This automatically connects the hydraulic spring means to the pressure source while the step piston moves from the first end position in the direction of the second end position, provided that the first annular space is connected to the pressure source. The pressure channel to the hydraulic spring means is arranged in an especially simple and space-saving manner within the stem piston. The hydraulic spring means are disconnected from the pressure source as soon as the control groove is no longer connected to the first annular space. As long as the control groove is connected to the first annular space, the application of supply pressure from the pressure source to the hydraulic spring means can be controlled by opening and closing the connection between the first annular space and the pressure source.

In a further embodiment of the present invention, the pressure channel contains a non-return valve which prevents the pressure in the hydraulic spring means from decreasing via the pressure channel. When the pressure channel is connected to the pressure source, the non-return valve opens as the pressure in the hydraulic spring means drops below the supply pressure of the pressure source following a movement of the stem piston.

In a further embodiment of the present invention, the first annular space can be connected to the pressure source via a hydraulic actuator that also causes the stem piston to move from a first end position in the direction of a second end position. This eliminates the need to provide a separate actuator for the pressure control means. The beginning of the variable portion of the valve lift is defined by the connection between the control groove in the stem piston and the first annular space. The end of the variable portion of the valve lift is defined either by separating the control groove from the first annular space or switching the hydraulic actuator.

In a further embodiment of the present invention, the pressure control means for connecting the hydraulic spring means to the pressure source have a shutoff element for closing the pressure channel, with the shutoff element being alternately connected to the pressure source and a pressure sink through hydraulic means for opening and closing the pressure channel at a first end and being held open during the variable portion of the valve lift. The shutoff element can be controlled independently of the pressure in the pressure channel through hydraulic means. Using the shutoff element eliminates the need for a hydraulic medium flowing to the hydraulic spring means to pass through an on-off valve with an adequately large opening cross-section.

In a further embodiment of the present invention, the shutoff element for closing the pressure channel is assigned a resetting spring that operates in the closing direction of the shutoff element, and the shutoff element is connected to the hydraulic spring means in a way that allows pressure to be applied, opening the pressure channel against the force of the resetting spring. This allows the shutoff element to open and close as a function of the difference between the pressure in the hydraulic spring means and the control line pressure.

In a further embodiment of the present invention, the control line can be connected to the pressure source and the pressure sink via a hydraulic actuator that also triggers the movement of the stem piston from the first end position in the direction of the second end position. The hydraulic actuator thus controls both the stem piston and the shutoff element. In an alternative embodiment of the present invention, the control line is connected to the pressure source via a throttle and to the pressure sink via an on-off valve. The control line is preferably coupled with the pressure source and pressure sink so that the shutoff element also opens when the stem piston moves from its first end position, in which the valve is closed, in the opening direction.

In a further embodiment of the present invention, the pressure control means define the variable portion of the valve lift, and thus the valve actuating energy, as a function of a counter-pressure acting upon the valve, in particular as a function of the combustion chamber pressure and thus the engine load in the case of a gas exchange valve of an internal combustion engine.

DETAILED DESCRIPTION

Figure 1:
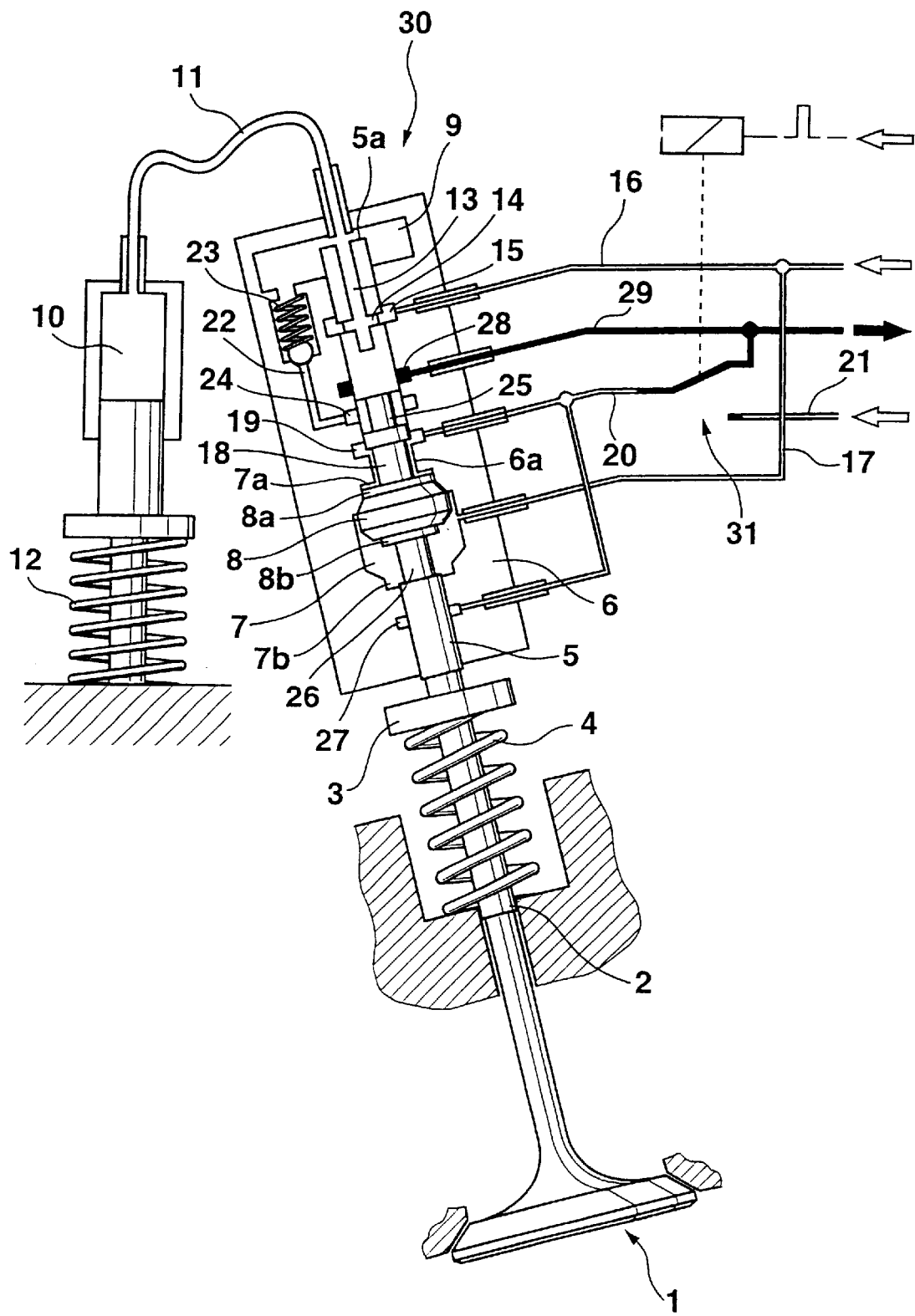
FIG. 1 shows a schematic longitudinal sectional view of a first embodiment of a hydraulically controllable globe valve in an internal combustion engine having a stem piston to which a pressure can be applied as well as pressure control means that can be connected to a pressure source via a control groove in the stem piston.

An internal combustion engine, in particular a reciprocating engine for a motor vehicle, has multiple working cylinders in the known manner whose combustion chambers are each provided with at least one globe valve 1 for supplying combustion air (intake valve) and for discharging the combustion exhaust gases (exhaust valve). A hydraulic control mechanism 30, 40, 50, 60, which can be designed in different embodiments according to FIGS. 1 through 4, is provided to control each globe valve 1. Hydraulic control mechanisms 30, 40, 50, 60 of globe valves 1 of all working cylinders in the internal combustion engine preferably can be controlled by engine electronics designed in the form of a central control unit. Each of FIGS. 1 through 4 shows the valve in its closed position.

According to all embodiments of the hydraulic control mechanism, globe valve 1 has a valve stem 2 and a spring holder 3 permanently connected to the latter. A spring force operating in the valve closing direction can be applied to valve stem 2 by a helical compression spring 4 via spring holder 3.

Valve stem 2 is positioned in corresponding hydraulic control mechanism 30, 40, 50, 60 so that it can move linearly together with a stem piston 5, with stem piston 5 guided in a cylindrical guide 6a of a valve housing 6. At one point, cylindrical guide 6a widens to form a working space 7, through which stem piston 5 passes. Working space 7 contains a control piston 8, which forms one piece with stem piston 5. Control piston 8 includes an upper and a lower plunger 8a and 8b, which enter corresponding pressure chambers 7a and 7b of working space 7. Pressure chambers 7a and 7b are designed so that they are separated from the remaining volume of working space 7 by plungers 8a and 8b at the end positions of stem piston 5.

In reference to FIG. 1, a first embodiment of the globe valve according to the present invention having hydraulic control mechanism 30 is described below. In this control mechanism 30, a working space 9, into which one end of stem piston 5 enters, is provided in valve housing 6 at the end of stem piston 5 facing away from helical compression spring 4. Working space 9 and a pressure cylinder 10 which are connected to each other by a line 11, form a hydraulic spring means that is connected in series to a mechanical spring means in the form of a compression spring 12. Spring arrangements of this type are already known from German Patent No. 196 21 951 and German Patent No. 197 16 042 cited above and described in detail in these publications.

In the illustrated first position (rest position) of stem piston 5, working space 9 is connected to a supply line 16 via a channel 13 and a groove 14 in stem piston 5 as well as via an annular groove 15 provided in the housing. The working pressure of hydraulic control mechanism 30 generated by a pressure source (not illustrated) is present in supply line 16, and the hydraulic medium can flow into control mechanism 30 via this supply line 16. With stem piston 5 in its rest position, the maximum working pressure is therefore present in hydraulic spring means 9, 10, 11, so that a maximum compressive force is exerted on an upper end 5a of stem piston 5 in the opening direction of globe valve 1. At the same time, upper pressure chamber 7a is connected to a control line 20 via a groove 18 in stem piston 5 and an annular space 19 in the housing, with this control line 20 being relieved of pressure via a suitably switched control valve 31. Working space 7 is permanently connected to the pressure source via a supply line 17 so that, while stem piston 5 is in this position, a force is exerted on control piston 8 in the valve closing direction, with this force, combined with the force of helical compression spring 4, being sufficient to hold stem piston 5 and globe valve 1 in the rest position against the force of prestressed hydraulic spring means 9, 10, 11.

The switchover of control valve 31 causes stem piston 5 to move out of its rest position, connecting control line 20 to supply line 21 and thus placing upper pressure chamber 7a under the working pressure. The compressive forces acting upon stem piston end 5a and upper plunger 8a overcome the compressive forces acting upon lower plunger 8b as well as the spring forces of helical compression spring 4, so that stem piston 5 moves together with globe valve 1 from the illustrated rest position in the direction of the globe valve opening position.

As stem piston 5 withdraws, groove 14 leaves annular space 15, thus disconnecting hydraulic spring means 9, 10, 11 from supply line 16. As stem piston 5 continues to withdraw, the pressure in hydraulic spring means 9, 10, 11 therefore threatens to drop, reducing the force on stem piston 5. To avoid this pressure loss, valve housing 6 contains pressure control means 22 to 25 to variably connect hydraulic spring means 9, 10, 11 to the pressure source. Pressure control means 22 to 25 include a pressure channel 22, which can be closed off by a non-return valve, between working space 9 and an annular space 24. A control groove 25 is also provided in stem piston 5 and connects annular space 24 to annular space 19, and thus to control line 20, when stem piston 5 is in the correct position.

When stem piston 5 thus moves out of its first end position (rest position), the connection between groove 14 and annular space 15 is first established and, simultaneously or immediately afterward, a connection is established between annular spaces 19 and 24 via control groove 25. The working pressure present in control line 20 reaches pressure channel 22 through the connection between the two annular spaces 19 and 24 and opens non-return valve 23 against the force of a spring of non-return valve 22 and against the pressure in working space 9 so that the working pressure remains applied to hydraulic spring means 9, 10, 11. To end this state, either control line 20 is relieved of pressure by resetting control valve 31 to the position shown in FIG. 1, or by interrupting the connection between annular space 24 and control groove 25 by withdrawing stem piston 5. In both situations, the reflux of the hydraulic medium to working space 9 ends, and non-return valve 23 once again closes off pressure channel 22. During the portion of the valve lift in which both annular spaces 19 and 24 are connected via control groove 25, hydraulic spring means 9, 10, 11 can be connected to the pressure source or a pressure sink by control valve 31 in a largely selectable manner. This makes it possible to compensate the pressure drop in hydraulic springs 9, 10, 11 caused by stem piston 5 leaving working space 9, or even prevent it from happening in the first place.

At the end of the valve lift, stem piston 5 reaches its second end position in which lower plunger 8b enters lower pressure chamber 7b, and this pressure chamber is connected via a groove 26 and an annular space 27 to control line 20, which is now relieved of pressure by the previous switchover of control valve 31. At the same time, groove 14 connects to an annular space 28, which is permanently connected to the pressure sink via a pressure relief line 29, when stem piston 5 is in this second end position. Consequently, hydraulic spring means 9, 10, 11 is also relived of pressure when stem piston 5 is in this position, allowing globe valve and stem piston 5 to return to the first end position.

Hydraulic control mechanism 30 according to the present invention can preferably be used to control the exhaust valves of the internal combustion engine mentioned in the preamble which can open only with high gas pressures in the combustion chambers. With different loads on the engine, gas pressures of different levels and different lengths are present in the combustion chambers, exerting forces on globe valve 1 in its closing direction and making it difficult to open the valve. Hydraulic control mechanism 30 for opening the globe valve must therefore not only be able to overcome the maximum possible forces exerted in the valve closing direction but also provide, during the globe valve period, an adequate actuating energy, which, moreover, should not last too long. As described above, this condition is achieved by connecting hydraulic spring means 9, 10, 11 to the pressure source of control mechanism 30 during a variable portion of the valve lift. In doing this, the working pressure of the pressure source is adjusted to the maximum necessary force application, while the period or distance of the valve lift over which the high working pressure is applied to the hydraulic spring means can be defined as a function of the energy required while globe valve 1 opens, i.e., in particular as a function of engine load. In the present embodiment, the beginning of the variable portion of the valve lift is defined by annular spaces 19 and 24 being connected via control groove 25, while the end of the variable portion of the valve lift is defined by pressure channel 22 being relieved of pressure after control valve 31 returns to the position shown in FIG. 1 or, at the latest, when annular space 24 and control groove 25 are disconnected from each other.

In a modified embodiment of hydraulic control mechanism 30, pressure control means 22 to 25 are replaced by a pressure channel between working space 9 and the pressure source which can be shut off by an additional on-off valve, in particular a 2/3-way valve.

Figure 2:
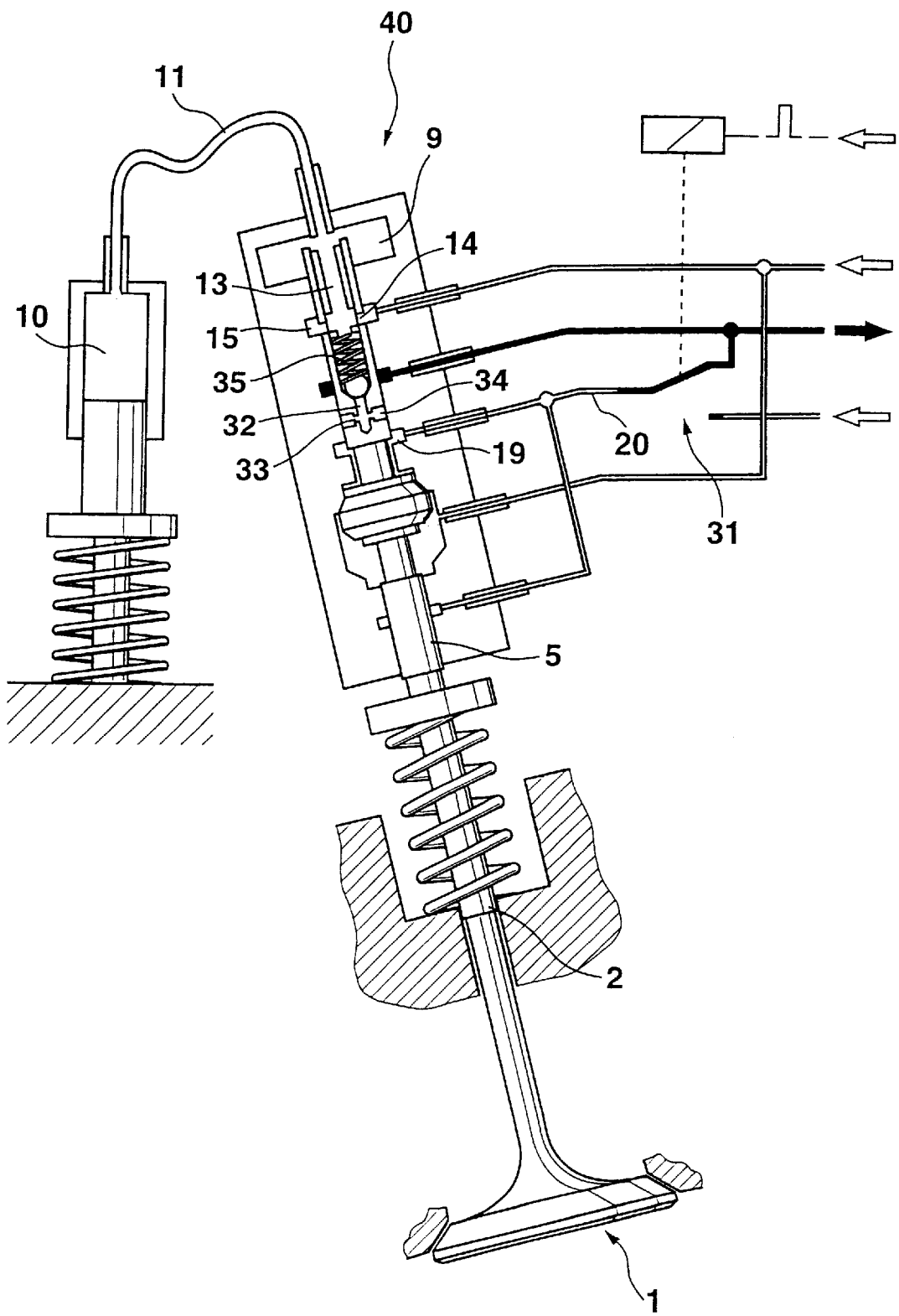
FIG. 2 shows a view according to FIG. 1, but for a second embodiment of the hydraulically controllable globe valve having pressure control means that are completely integrated into the stem piston.

FIG. 2 shows a second embodiment 40 of the hydraulic control mechanism according to the present invention in which pressure channel 22 illustrated in FIG. 1, together with corresponding annular space 24 in valve housing 6, is replaced by a pressure channel 32 provided in stem piston 5. Pressure channel 32 is connected via connecting bores 33 to a control groove 34, which travels over annular space 19 connected to control line 20 when stem piston 5 is withdrawn. A non-return valve 35, which corresponds to non-return valve 23 in FIG. 1, is provided between control groove 34 and groove 14 in pressure channel 32.

Hydraulic control mechanism 40 illustrated in FIG. 2 operates in much the same way as control mechanism 30 in FIG. 1. The switchover of a control valve 31 designed as a 3/2-way valve applies the working pressure from the pressure source (not illustrated) to control line 20, and hydraulic spring means 9, 10, 11, which is also under pressure, moves stem piston 5 from its first end position (rest position) in the direction of a second end position (open position). This interrupts the connection between groove 14 and annular space 15, at the same time closing the connection between control groove 34 and annular space 19. This ensures that the working pressure remains applied to working space 9 via pressure channel 32 and channel 13 while non-return valve 35 is open, as long as control line 20 is connected to the pressure source and control groove 34 has not crossed annular space 19.

Figure 3:
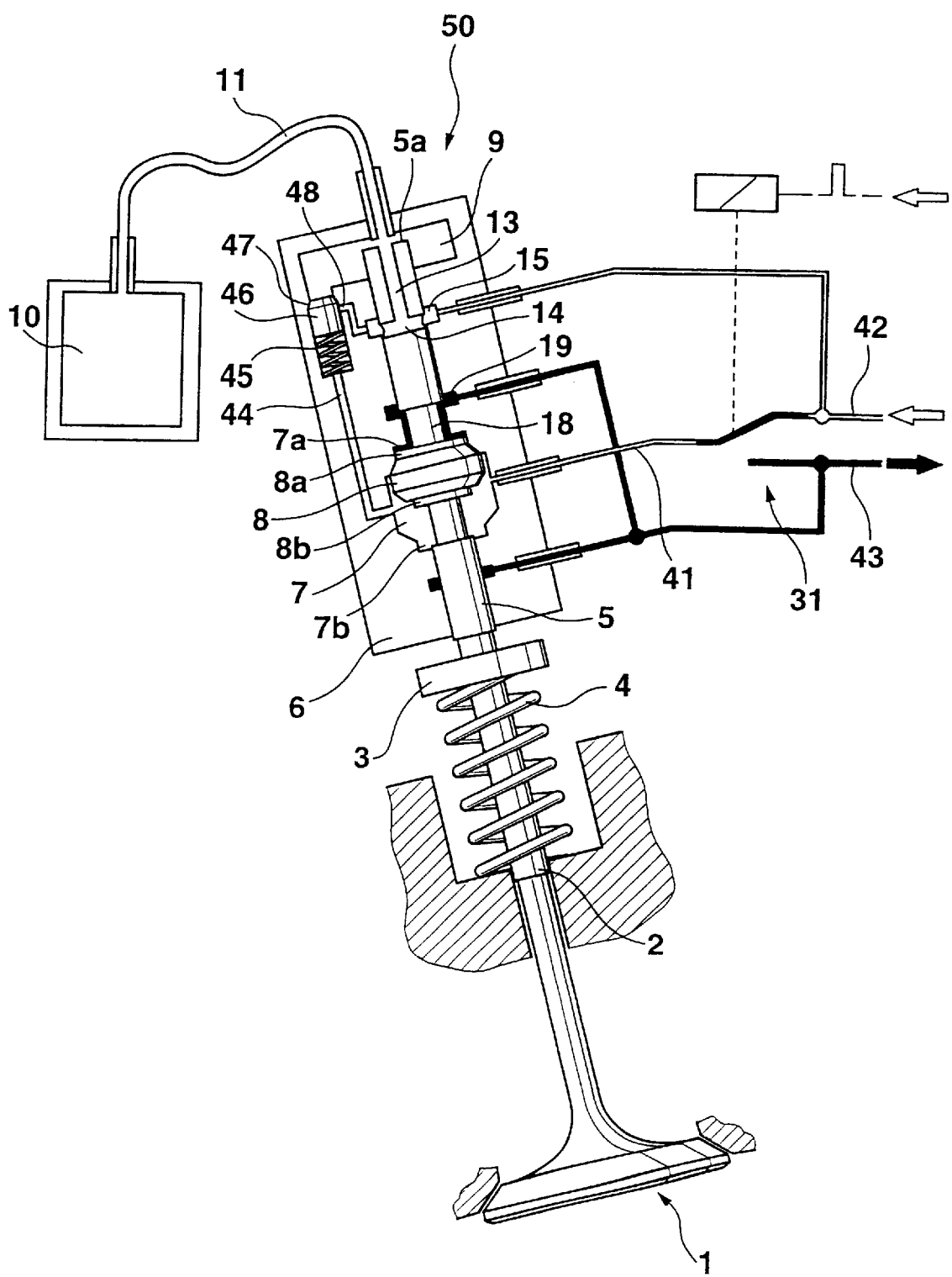
FIG. 3 shows a view according to FIG. 1, but for a third embodiment of the hydraulically controllable globe valve having pressure control means designed as a shutoff element for a closable pressure channel.

FIG. 3 shows a modified embodiment of a globe valve 1 according to the present invention, compared to the embodiments illustrated in FIGS. 1 and 2, having a hydraulic control mechanism 50. Like in the other embodiments, globe valve 1 is assigned a helical compression spring 4 which acts upon valve stem 2 via a spring holder 3 and exerts a force in the closing direction of globe valve 1. A stem piston 5, to which is assigned a control piston 8 guided in a working space 7, is provided in a cylindrical guide 6a of a valve housing 6 to actuate globe valve 1. Plungers 8a and 8b, which enter pressure chambers 7a and 7b, thereby separating a pressure chamber from working space 7 in the valve end positions, are provided at both ends of control piston 8.

A compressive force, which is capable of moving stem piston 5, together with globe valve 1, against the force of helical compression spring 4 and the other forces acting upon globe valve 1, can be applied to upper end 5a of stem piston 5 by a hydraulic spring means 9, 10, 11 in the opening direction of globe valve 1. Hydraulic control mechanism 50 can be switched via a control valve 31 designed as a 3/2-way valve that connects control line 41 to either a pressure source (not illustrated) via a supply line 42 or a pressure sink (not illustrated) via a pressure relief line 43. Control line 41 opens into working space 7, which is connected to a further control line 44. Control line 44 provides hydraulic control of a shutoff element 46 of a pressure channel 48. Pressure channel 48 connects working space 9 to the pressure source via annular space 14 and supply line 42 and can be closed off by shutoff element 46. Shutoff element 46 is designed as a stopper which is pressed into a conical seat 47 by a compression spring 45 and by the control line pressure. The pressure in working space 9 can be applied to stopper 46 in the opening direction.

The function of hydraulic control mechanism 50 can be described as follows. When globe valve 1 is in its first end position (rest position), as shown in FIG. 3, the maximum working pressure is applied to both working space 7 and hydraulic spring means 9, 10, 11. Because upper pressure chamber 7a is relieved of pressure, the combined forces on control piston 8 and the force on helical compression spring 4 are sufficient to hold globe valve 1 in the illustrated rest position against the compressive force of hydraulic spring means 9, 10, 11. The switchover of control valve 31 allows control line 41 to be connected to pressure relief line 43, thereby relieving working space 7 of pressure. This causes stem piston 5 to move from the illustrated end position in the direction of a second end position (open position), in which globe valve 1 is open. At the same time, the switchover of control valve 31 relieves control line 44 of pressure, so that the pressure in working space 9 presses stopper 46 against compression spring 45, opening pressure channel 48. Open pressure channel 48 connects the hydraulic spring means to supply line 42 and thus to the pressure source.

As stem piston 5 moves in the direction of the second end position, groove 14 separates from annular space 15, while working space 9 remains connected to the pressure source via pressure channel 48 and annular space 15. As soon as plunger 8a has left corresponding pressure chamber 7a, and annular space 19 is no longer connected to groove 18, the switching position of control valve 31 no longer affects the movement of stem piston 5, since the forces acting on control piston 8 cancel each other out. As a result, control valve 31 can be switched back to the illustrated position at any point in the movement of the stem piston from its first end position to its second end position or, with globe valve 1 in any position, between its closed rest position and its open position.

This again applies pressure to working space 7 and control line 14 so that stopper 46 is pressed back into its seat 47, thereby interrupting the connection between hydraulic spring means 9, 10, 11 and the pressure source.

As stem piston 5 continues to withdraw, the pressure in hydraulic spring means 9, 10, 11 decreases according to the increase in volume. With stem piston 5 in its second end position, groove 14 connects to annular space 19, which completely relieves hydraulic spring means 9, 10, 11 of pressure. Prior to this pressure relief, control valve 31 must return to the position shown in FIG. 3, so that the working pressure in working space 7 acting upon control piston 8 from above can hold stem piston 5 in its second end position against the force of helical compression spring 4 while pressure chamber 7b separated by lower plunger 8b is simultaneously relieved of pressure.

A further switchover of control valve 31 and a corresponding pressure relief in working space 7 cause the stem piston to return to the illustrated first position, which, however, has no effect on stopper 46, due to the pressure relief in working space 9. The stopper is also held in its closing position by compression spring 45.

In hydraulic control mechanism 50 according to FIG. 3, the operating principle described above allows the pressure in hydraulic spring means 9, 10, 11 to be maintained at the maximum working pressure of the control mechanism during a portion of the valve lift that can be varied in time or space. The variable portion of the valve lift begins when the switchover of control valve 31 causes stem piston 5 to start moving, and it ends at a freely selectable time when control valve 31 is reversed.

Stopper 46 also provides a safety function if the pressure source fails, causing the working pressure in control mechanism 50 to drop. If the hydraulic spring means is not completely relieved of pressure in this case, stopper 46 is automatically opened by the pressure difference between working space 9 and pressure channel 48, thus reducing the pressure in working space 9. However, since the force of compression spring 45 prevents the pressure in working space 9 from dropping all the way to the level of the remaining working pressure, an additional non-return valve can be provided between annular space 15 and working space 9 in channel 13, thus allowing hydraulic medium to flow out of working space 9 into annular space 15, but preventing it from flowing back in.

Figure 4:
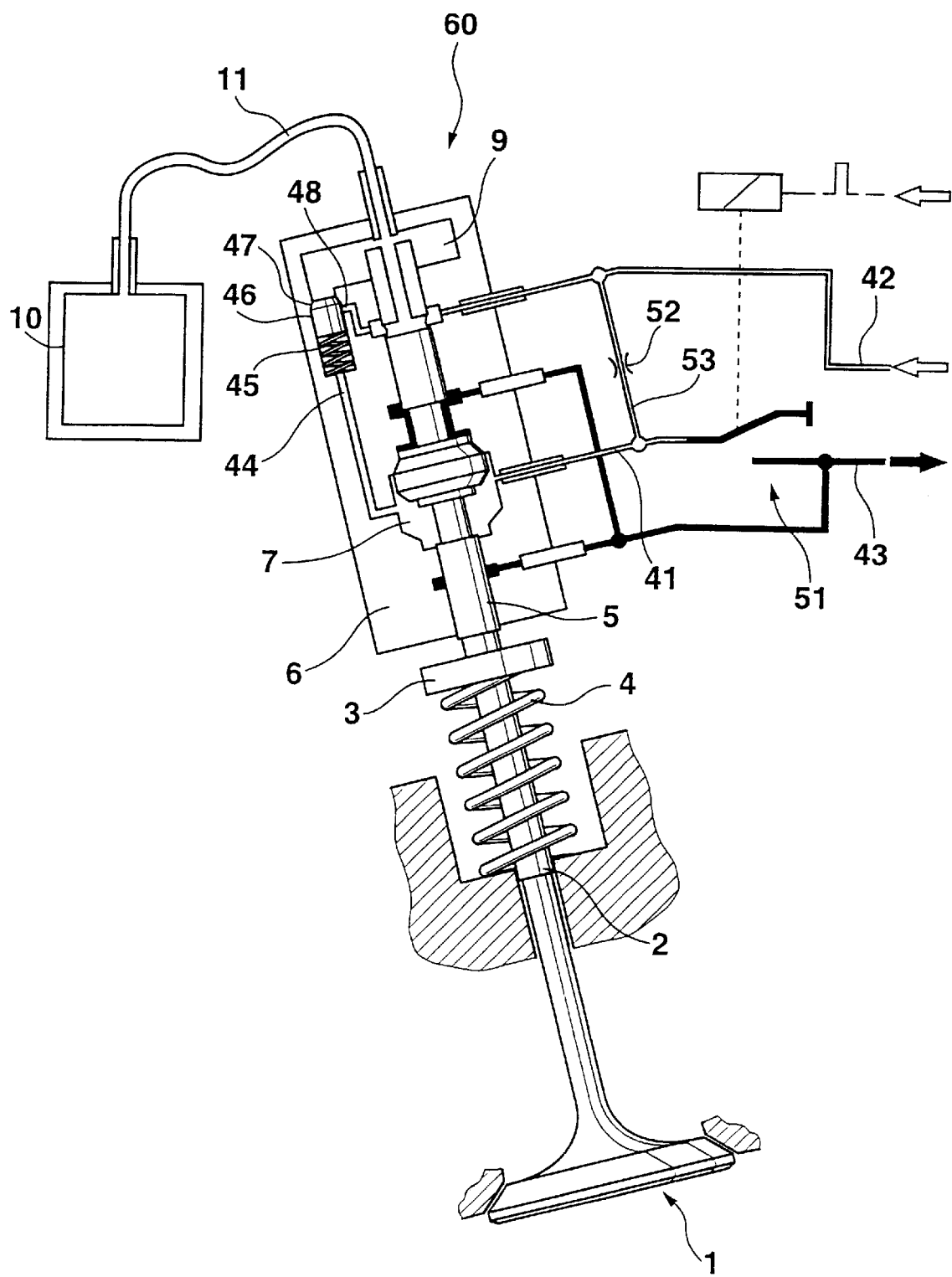
FIG. 4 shows a view according to FIG. 1, but for a fourth embodiment of the hydraulically controllable globe valve having a hydraulic actuator and a throttle as the pressure control means.

FIG. 4 shows a fourth embodiment of the globe valve according to the present invention having a corresponding hydraulic control mechanism 60. Hydraulic control mechanism 60 largely corresponds to control mechanism 50 illustrated in FIG. 3, with 3/2-way valve 31 provided in FIG. 3 and serving as a control valve being replaced by a 2/2-way valve 51 in conjunction with a throttle 52 in a bypass line 53. Bypass line 53 connects control line 41 to supply line 42.

The switchover of 2/2-way valve 51 serving as the control valve moves stem piston 5 from the illustrated first end position in the direction of the second end position, which quickly relieves working space 7 of pressure via pressure relief line 43. Even before significant quantities of hydraulic medium can flow from supply line 42 to control line 41 via throttle 52, upper plunger 8a emerges from pressure chamber 7a, after which control valve 51 can immediately return to the illustrated initial position.

As in the case of control mechanism 50 shown in FIG. 3, stopper 46 is opened by the pressure in working space 9 when control line 44 is relieved of pressure, and working space 9 is connected to the pressure source via pressure channel 48. The working pressure that builds back up over time in working space 7, and thus in control line 44, causes stopper 46 to close gradually during the valve lift. The behavior of stopper 46 is largely influenced by the dimensioning of throttle 52, which means that an adjustable throttle 52 can vary the closing speed of stopper 46, for example as a function of the operating conditions of an internal combustion engine equipped with the globe valve according to the present invention.

According to the proposed arrangement, the working pressure can be applied to hydraulic spring means 9, 10, 11 for different lengths of time during a variable portion of the valve lift, allowing the opening energy exerted on globe valve 1 to be varied accordingly. Shutoff element 46 is advantageously positioned so that it can be adjusted with a small volume of hydraulic medium, at the same time connecting a pressure channel with a comparatively large flow cross-section. A pressure channel with a large flow cross-section makes it possible to significantly increase the opening power of the control mechanism.

A shutoff element 46, like the one provided in control mechanisms 50 and 60 according to FIGS. 3 and 4, can, of course, also be controlled through other means. In particular, control line 44 can contain an element for inverting the pressure in the control line, thus opening stopper 46 when the working pressure is present in control line 44 and closing it when control line 44 is relieved of pressure.

What is claimed is:

1. A hydraulically controllable globe valve, comprising:
   a stem piston capable of being moved from a first end position in a direction of a second end position;
   a hydraulic spring arrangement connected to a pressure source and for applying a pressure to the stem piston the hydraulic spring arrangement includes a mechanical biasing element; and
   a pressure control arrangement for maintaining constant the pressure applied by the hydraulic spring arrangement on the stem piston while the stem piston moves from the first end position in the direction of the second end position by connecting the hydraulic spring arrangement to the pressure source during a variable portion of a valve lift operation.

2. The globe valve according to claim 1, wherein the globe valve corresponds to a gas exchange valve of an internal combustion engine.

3. The globe valve according to claim 1, wherein the pressure control arrangement variably defines a portion of the valve lift operation during which the pressure control arrangement maintains constant the pressure on the hydraulic spring arrangement as a function of a counter-pressure acting upon the globe valve.

4. The globe valve according to claim 1, further comprising:
   a valve housing surrounding the stem piston, wherein:
   the stem piston includes a control groove and a pressure channel,
   the pressure control arrangement includes, in order to connect the hydraulic spring arrangement to the pressure source, a first annular space provided in the valve housing and capable of being connected to the pressure source,
   the control groove is capable of being connected to the hydraulic spring arrangement via the pressure channel, and
   the control groove is connected to the first annular space during the variable portion of the valve lift operation.

5. A hydraulically controllable globe valve, comprising:
   a stem piston capable of being moved from a first end position in a direction of a second end position;
   a hydraulic spring arrangement connected to a pressure source and for applying a pressure to the stem piston;
   a pressure control arrangement for maintaining constant the pressure applied by the hydraulic spring arrangement on the stem piston while the stem piston moves from the first end position in the direction of the second end position by connecting the hydraulic spring arrangement to the pressure source during a variable portion of a valve lift operation;
   a valve housing surrounding the stem piston; and
   a pressure channel, wherein:
   the stem piston includes a control groove,
   the pressure control arrangement includes, in order to connect the hydraulic spring arrangement to the pressure source:
   a first annular space provided in the valve housing and capable of being connected to the pressure source, and
   a further annular space capable of being connected to the hydraulic spring arrangement via the pressure channel, and
   the further annular space is connected to the first annular space via the control groove during the variable portion of the valve lift operation.

6. The globe valve according to claim 5, further comprising:
   a hydraulic actuator for simultaneously triggering a movement of the stem piston from the first end position in the direction of the second end position, wherein the first annular space is capable of being connected to the pressure source via the hydraulic actuator.

7. The globe valve according to claim 5, further comprising:
   a non-return valve for preventing the pressure from decreasing in the hydraulic spring arrangement via the pressure channel, the non-return valve being arranged in the pressure channel.

* * * * *